(12) United States Patent
Ichihara et al.

(10) Patent No.: US 12,065,127 B2
(45) Date of Patent: Aug. 20, 2024

(54) CONTROL METHOD AND CONTROL DEVICE FOR HYBRID VEHICLE

(71) Applicant: NISSAN MOTOR CO., LTD., Yokohama (JP)

(72) Inventors: Hiroki Ichihara, Kanagawa (JP); Tsuyoshi Arinaga, Kanagawa (JP); Tomoya Tojo, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 693 days.

(21) Appl. No.: 17/273,066

(22) PCT Filed: Sep. 4, 2018

(86) PCT No.: PCT/JP2018/032690
§ 371 (c)(1),
(2) Date: Mar. 3, 2021

(87) PCT Pub. No.: WO2020/049625
PCT Pub. Date: Mar. 12, 2020

(65) Prior Publication Data
US 2021/0206366 A1 Jul. 8, 2021

(51) Int. Cl.
*B60W 20/15* (2016.01)
*B60W 10/06* (2006.01)
*B60W 10/08* (2006.01)
*F02B 75/04* (2006.01)
*F02D 15/00* (2006.01)

(52) U.S. Cl.
CPC ............ *B60W 20/15* (2016.01); *B60W 10/06* (2013.01); *B60W 10/08* (2013.01); *F02B 75/04* (2013.01); *F02D 15/00* (2013.01); *B60W 2510/244* (2013.01)

(58) Field of Classification Search
None
See application file for complete search history.

(56) References Cited

U.S. PATENT DOCUMENTS

| 5,650,713 A | 7/1997 | Takeuchi et al. |
| 2017/0320485 A1* | 11/2017 | Miller .................. F02D 35/027 |
| 2018/0195449 A1 | 7/2018 | Mano |

FOREIGN PATENT DOCUMENTS

| JP | 08-79914 A | 3/1996 |
| JP | 2004270679 A * | 9/2004 |

(Continued)

*Primary Examiner* — Todd Melton
*Assistant Examiner* — Jason R Roberson
(74) *Attorney, Agent, or Firm* — Foley & Lardner LLP

(57) ABSTRACT

A hybrid vehicle includes an internal combustion engine and a motor generator, wherein the internal combustion engine includes a variable compression ratio mechanism structured to vary in mechanical compression ratio depending on variation in position of a compression ratio control member structured to move due to driving of an electric actuator. A control method for the hybrid vehicle includes: measuring a state of charge of a battery connected to the motor generator; and in response to regenerative operation of the motor generator in a state that the state of charge of the battery is equal to or higher than a predetermined level, consuming generated electric power by driving the electric actuator of the variable compression ratio mechanism.

7 Claims, 3 Drawing Sheets

(56) References Cited

FOREIGN PATENT DOCUMENTS

| JP | 2009-275564 A | 11/2009 |
| JP | 2016-117451 A | 6/2016 |
| WO | WO 2014/141729 A1 | 9/2014 |
| WO | WO 2016/203634 A1 | 12/2016 |

* cited by examiner

CONTROL METHOD AND CONTROL DEVICE FOR HYBRID VEHICLE

TECHNICAL FIELD

The present invention relates to a control method and a control device for a hybrid vehicle including an internal combustion engine with a variable compression ratio mechanism.

BACKGROUND ART

Patent Document 1 discloses an art in which in a series hybrid vehicle structured to travel by driving an electric motor with electric power generated in a generator driven by an internal combustion engine, the internal combustion engine is contrarily driven with regenerated electric power via the generator, after full charge of a battery during regenerative operation of the electric motor upon vehicle deceleration. In other words, the art allows regenerative braking with use of the electric motor by consuming surplus regenerative electric power in rotary driving (i.e. so-called motoring) of the internal combustion engine, after the full charge of the battery.

However, such conventional method is likely to cause an uncomfortable feeling to a driver and a passenger because the internal combustion engine that has been in a stopped state until the full charge of the battery starts to rotate rapidly in response to the full charge of the battery, in case that, for example, the vehicle travels a long downward slope with use of the regenerative braking.

PRIOR ART DOCUMENT(S)

Patent Document(s)

Patent Document 1: JP H08-79914 A

SUMMARY OF THE INVENTION

Problem(s) to be Solved by the Invention

According to one aspect of the present invention, a hybrid vehicle with an internal combustion engine employing a variable compression ratio mechanism including an electric actuator is controlled such that in response to regenerative operation of a motor generator under a state of charge of a battery equal to or higher than a predetermined level, generated electric power is consumed by driving the electric actuator of the variable compression ratio mechanism.

In general, change in mechanical compression of the internal combustion engine due to driving of the electric actuator of the variable compression ratio mechanism causes no perceptible change to a driver and a passenger. Even if the electric actuator emits a slight driving noise, the driving noise of the electric actuator is far smaller than a mechanical noise due to motoring of the internal combustion engine. This serves to absorb surplus electric power due to the regenerative operation, without causing an uncomfortable feeling to a driver and a passenger.

MODE(S) FOR CARRYING OUT THE INVENTION

The following describes an embodiment in which the present invention is applied to a series hybrid vehicle.

Figure 1:
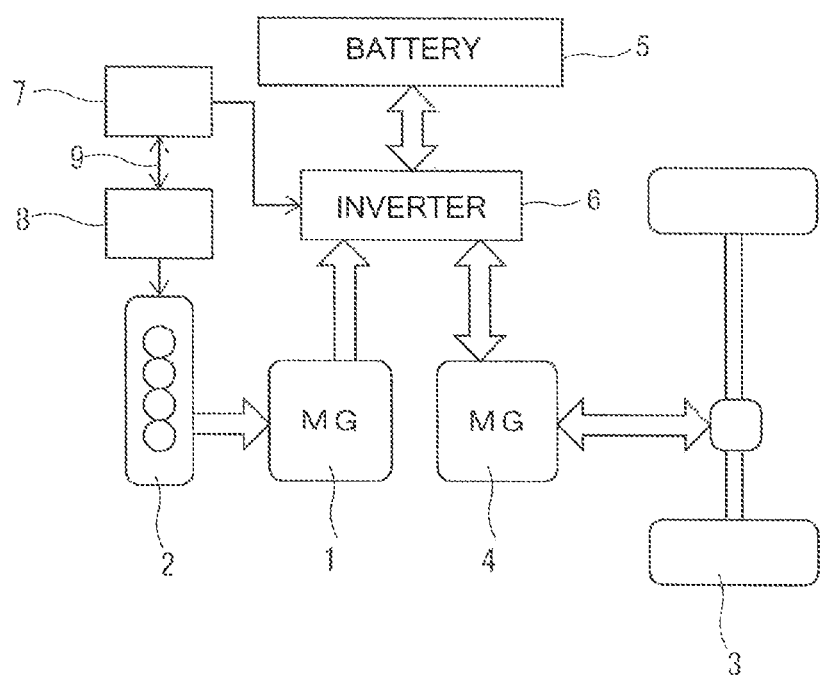
FIG. 1 is an illustrative view showing configurations of a series hybrid vehicle according to an embodiment.

FIG. 1 schematically shows configurations of the series hybrid vehicle according to the embodiment. The series hybrid vehicle includes: a power generation motor generator 1 mainly serving as a generator; an internal combustion engine 2 serving as a power generation internal combustion engine structured to drive the power generation motor generator 1 in response to request for electric power; a travel motor generator 4 mainly serving as a motor for driving of drive wheels 3; a battery 5 structured to temporarily store generated electric power; and an inverter device 6 structured to perform electric power conversion between battery 5 and motor generators 1 and 4. The electric power generated in power generation motor generator 1 driven by internal combustion engine 2 is stored in battery 5 via inverter device 6. Travel motor generator 4 is driven with the electric power stored in battery 5, via inverter device 6. Travel motor generator 4 during regenerative operation generates regenerative electric power that is stored in battery 5 via inverter device 6. Thus, inverter device 6 includes an inverter for power generation motor generator 1 and an inverter for travel motor generator 4.

Inverter 6 is under control of a vehicle-side controller 7 controlling travel of the vehicle. This allows vehicle-side controller 7 to control operation of motor generators 1 and 4 via the control on inverter device 6. Vehicle-side controller 7 receives signals indicating an accelerator opening degree, a vehicle speed, a brake pedal operation amount, etc. of the vehicle and a signal indicating a state of charge (so-called SOC) of battery 5. The state of charge (SOC) is measured based on a terminal voltage etc. of battery 5.

Internal combustion engine 2 is under control of an engine controller 8. Engine controller 8 and vehicle-side controller 7 are connected to each other via an in-vehicle network 9, and interchange signals with each other. Internal combustion engine 2 structured to drive power generation motor generator 1 is operated via engine controller 8 in response to the request for electric power from the vehicle including the state of charge (SOC) of battery 5. In other words, when engine controller 8 receives the request for electric power sent from vehicle-side controller 7 depending on the accelerator pedal opening degree, the vehicle speed, etc. of the vehicle, internal combustion engine 2 is controlled based on such request for electric power. Incidentally, vehicle-side controller 7 and engine controller 8 may be integrated to a single controller.

Figure 2:
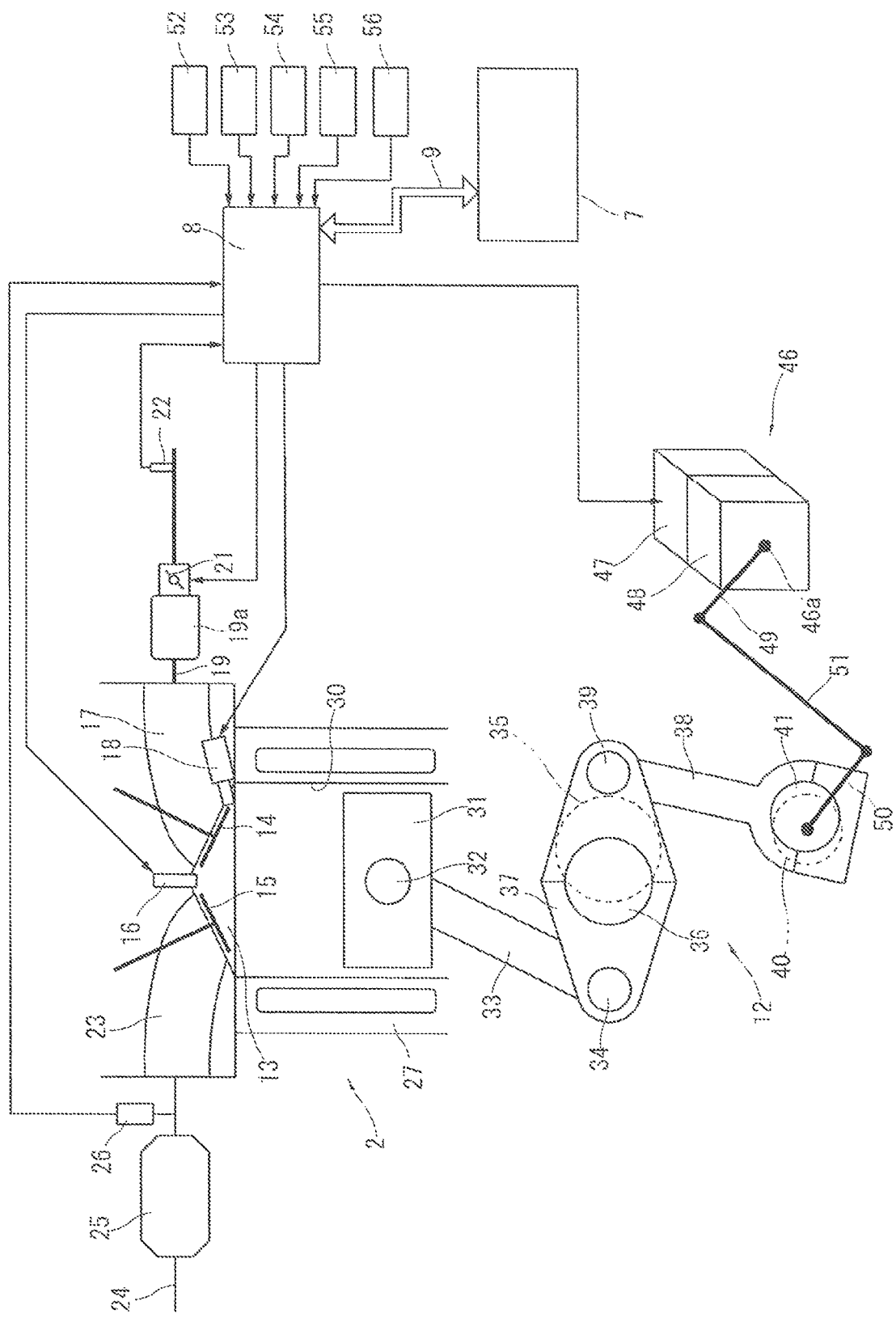
FIG. 2 is an illustrative view showing configurations of an internal combustion engine including a variable compression ratio mechanism.

FIG. 2 is an illustrative view showing system configurations of internal combustion engine 2. Internal combustion engine 2 is a four-stroke cycle spark ignition type internal combustion engine, and includes a variable compression ratio mechanism 12 employing a multi-link type piston crank mechanism. Internal combustion engine 2 further includes a pair of intake valves 14 and a pair of exhaust valves 15 disposed in a ceiling wall surface of a combustion chamber 13, and includes a spark plug 16 disposed in a central region surrounded by intake valves 14 and exhaust valves 15.

Intake valves 14 are structured to open and close an intake port 17 below which a fuel injection valve 18 for direct fuel injection into combustion chamber 13 is disposed. Fuel injection valve 18 is an electromagnetic type or piezoelectric type injection valve structured to open in response to a drive pulse signal applied thereto, and inject an amount of fuel substantially in proportion to a pulse width of the drive pulse signal. Incidentally, this cylinder direct injection system may be replaced with a port injection system configured to inject fuel in intake port 17.

Intake port 17 is connected to an intake passage 19 including a collector 19a. Intake passage 19 is provided with: an electronically-controlled throttle valve 21 that has an opening degree controlled in accordance with a control signal from engine controller 8 and is installed upstream with respect to collector 19a in intake passage 19; and an air flow meter 22 structured to measure an amount of intake air and disposed upstream with respect to the throttle valve 21 in intake passage 19.

An exhaust port 23 is connected to an exhaust passage 24. Exhaust passage 24 is provided with: a catalyst device 25 that employs a three-way catalyst and is installed in exhaust passage 24; and an air-fuel ratio sensor 26 structured to measure an air-fuel ratio and disposed upstream with respect to catalyst device 25 in exhaust passage 24.

Variable compression ratio mechanism 12 employs a known multi-link type piston crank mechanism, and includes an upper link 33 (i.e. a first link), a lower link 37 (i.e. a second link), and a control link 38 (i.e. a third link). Upper link 33 includes a first end connected to a piston 31 via a piston pin 32, wherein piston 31 is structured to move inside a cylinder 30. Upper link 33 further includes a second end connected to a first end of lower link 37 via an upper pin 34 (i.e. a first connection pin). Lower link 37 includes a middle portion connected to a crank pin 36 of a crank shaft 35, and has a degree of freedom regulated by control link 38. Control link 38 includes a top end connected to a second end of lower link 37 via a control pin 39 (i.e. a second connection pin), and includes a bottom end swingably supported by an eccentric shaft 41 of a control shaft 40. Each of crank shaft 35 and control shaft 40 is rotatably supported by a bearing structure not shown, in a crank case composing a lower section of cylinder block 27.

In the multi-link type piston crank mechanism as configured above, piston 31 varies in top dead center position due to vertical variation in position of eccentric shaft 41 (i.e. position of a swing fulcrum of control link 38) which depends on a rotational position of control shaft 40. The variation in top dead center position of piston 31 results in variation in mechanical compression ratio of the engine. In other words, the mechanical compression ratio is uniquely determined by the rotational position of control shaft 40. Accordingly, control shaft 40 serves as a compression ratio control member having a rotational position by which the mechanical compression ratio is uniquely determined.

Variable compression ratio mechanism 12 is variable in compression ratio under control of a drive mechanism, i.e. an electric actuator 46 that is disposed in the lower section of cylinder block 27 and includes an output shaft 46a parallel with crank shaft 35. Electric actuator 46 further includes an electric motor 47 and a speed reducer 48 which are connected to each other and arranged in series. Electric motor 47 serves as an actuator body. Speed reducer 48 is structured to decelerate rotation outputted from electric motor 47 and then output it through output shaft 46a. Output shaft 46a and control shaft 40 are parallel with each other, and are connected to each other where a first arm 49 fixed to output shaft 46a and a second arm 50 fixed to control shaft 40 are connected to each other via an intermediate link 51. This allows output shaft 46a and control shaft 40 to rotate in linkage with each other.

Accordingly, the rotation of output shaft 46a of electric actuator 46 is transferred to second arm 50 via first arm 49 and intermediate link 51, and then causes control shaft 40 to rotate. This results in the variation in mechanical compression ratio of internal combustion engine 2 as described above. Speed reducer 48 has a sufficient speed reduction ratio, e.g. 1:100 or 1:200, in order to generate a sufficient drive torque with use of electric motor 47 relatively small. Although output shaft 46a and control shaft 40 exemplified in the drawing rotate in counter directions to each other, first arm 49 and second arm 50 and intermediate link 51 may be arranged such that output shaft 46a and control shaft 40 rotate in a same direction with each other.

Engine controller 8 sets a target compression ratio of variable compression ratio mechanism 12 in order to achieve an optimal fuel efficiency depending on engine operation conditions (i.e. a load and an engine speed) determined from a required electric power. Then, electric actuator 46 (in detail, electric motor 47) is driven in accordance with the target compression ratio. The rotational position of control shaft 40 corresponding to an actual mechanical compression ratio is measured by an actual compression ratio sensor 52. This allows electric motor 47 to be driven under feedback control to follow the target compression ratio. In this compression ratio control, the target compression ratio is basically set to be: high for improvement in thermal efficiency, in case that the required electric power is low and internal combustion engine 2 is operated under relatively low-speed low-load conditions: and low in view of knockings, in case that the required electric power is high and internal combustion engine 2 is operated under relatively high-speed high-load conditions.

In addition to signals from air flow meter 22, air-fuel ratio sensor 26, and actual compression ratio sensor 52, engine controller 8 receives signals from various sensors such as: a crank angle sensor 53 structured to measure a rotational speed of internal combustion engine 2; a water temperature sensor 54 structured to measure a temperature of cooling water in internal combustion engine 2; an accelerator opening sensor 55 structured to measure a depression amount of an accelerator pedal operated by a driver; and a vehicle speed sensor 56 structured to measure the vehicle speed. The signals are inputted to engine controller 8 directly from the sensors or via in-vehicle network 9 from vehicle-side controller 7. Based on these measurement signals, engine controller 8 optimally controls: the mechanical compression ratio of variable compression ratio mechanism 12; the opening degree of throttle valve 21; an amount and a timing of fuel injection from fuel injection valve 18; and an ignition timing of spark plug 16. Furthermore, engine controller 8 starts and stops internal combustion engine 2 in accordance with a start command and a stop command of internal combustion engine 2 which are sent from vehicle-side controller 7 depending on necessity for electric power generation. Incidentally, upon starting the engine, power generation motor generator 1 may be used for cranking.

Figure 3:
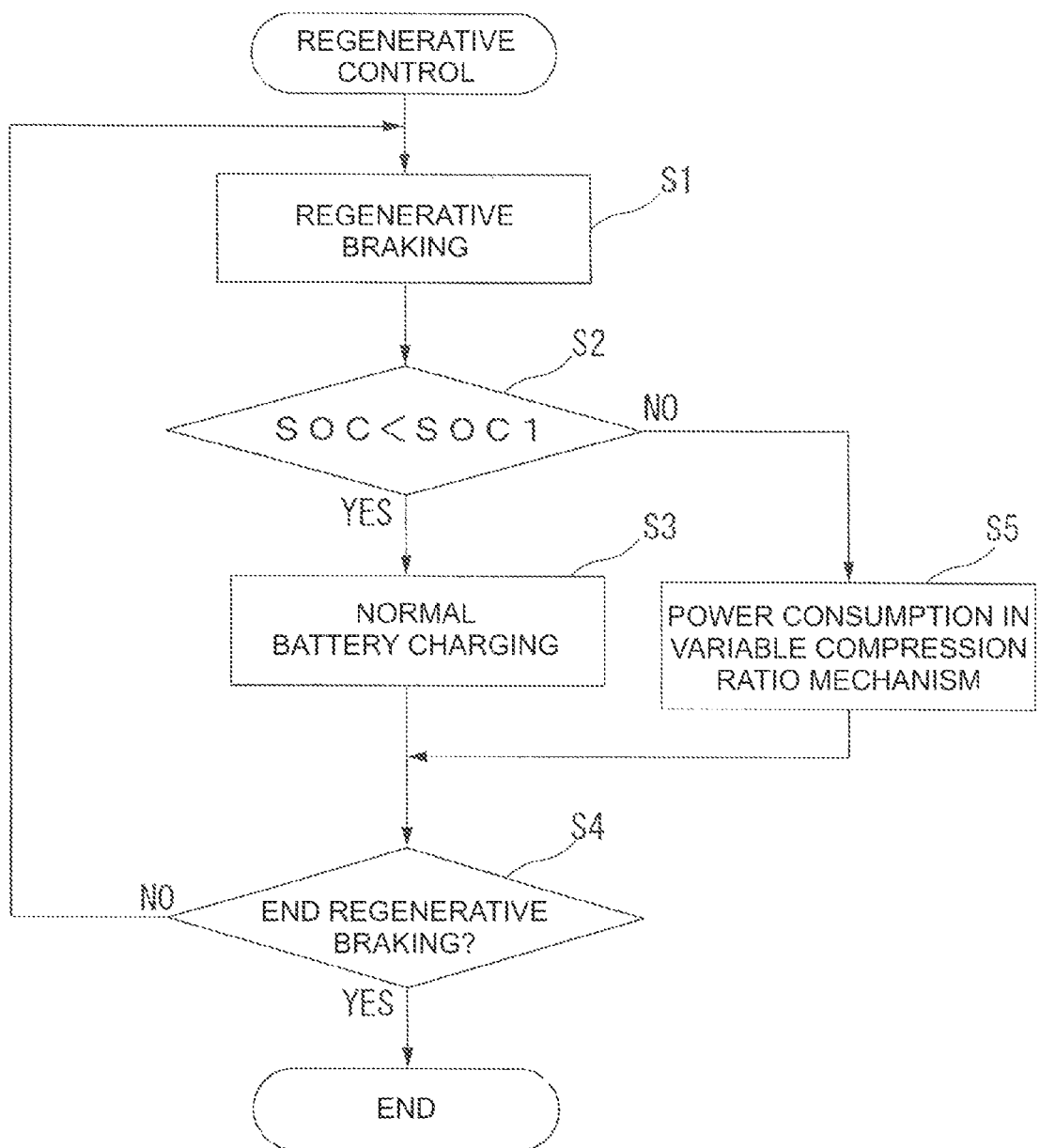
FIG. 3 is a flow chart showing processes for regenerative control.

FIG. 3 is a flow chart of regenerative control implemented by vehicle-side controller 7 during deceleration of the vehicle. For example, this is implemented in response to satisfaction of a condition that the accelerator opening degree becomes zero or the brake pedal becomes depressed during vehicle travel. In step S1 of the regenerative control, travel motor generator 4 is driven for regenerative operation to generate a target braking force as regenerative braking. Step S2 is determination of whether the state of charge (SOC) of battery 5 is currently lower than a predetermined level (i.e. SOC1) set in a vicinity of a full charge level.

If determined that the state of charge (SOC) of battery 5 is lower than the predetermined level (SOC1), step S3 is executed to normally charge regenerative electric power, which is generated due to the regenerative operation, to battery 5. Subsequently to step S3, step S4 is executed to determine whether to end the regenerative braking: i.e. whether a condition to end the regenerative braking is satisfied. If the regenerative braking is not ended, step S1 is executed again to continue the regenerative operation of travel motor generator 4. The regenerative braking is ended in response to, for example, depression of the accelerator pedal, stop of the vehicle, shift from the regenerative braking to hydraulic braking, etc.

If determined in step S2 that the state of charge (SOC) of battery 5 is equal to or higher than the predetermined level (SOC1), step S5 is executed subsequently to step S2 so as to implement electric power consumption in electric actuator 46 of variable compression ratio mechanism 12: in other words, so as to drive the electric actuator 46 to consume surplus electric power without charging the battery 5. Under a condition to proceed from step S2 to step S5, internal combustion engine 2 is basically in a stopped state, because there is no request for electric power from travel motor generator 4 and the SOC is at a high level. Consequently, electric actuator 46 is driven to change a link geometry of the mufti-link type piston crank mechanism composing variable compression ratio mechanism 12, with internal combustion engine 2 stopped.

In step S5, electric actuator 46 is actually driven under control of engine controller 8 in accordance with a command from vehicle-side controller 7. Specifically, during continuation of step S5, electric actuator 46 is controlled to perform reciprocating rotary motion at a suitable speed, in order to cause the mechanical compression ratio to change upward and downward: in other words, controlled to force the mechanical compression ratio to periodically change, temporarily departing from the basic target compression ratio. The surplus electric power is effectively consumed by continuously driving electric actuator 46 of variable compression ratio mechanism 12 during the regenerative braking, because electric actuator 46 is structured as an auxiliary device of internal combustion engine 2 and consumes a relatively large amount of electric power.

In case that, for example, the vehicle travels a long downward slope with use of the regenerative braking, electric actuator 46 that has been in a stopped state starts to be driven in response to satisfaction of the condition that the SOC of battery 5 becomes equal to or higher than the SOC 1 on the way. However, the change in mechanical compression in the state that internal combustion engine 2 is stopped causes no perceptible change to a driver and a passenger. Even if electric actuator 46 emits a slight driving noise, the driving noise of electric actuator 46 is far smaller than a mechanical noise due to motoring of internal combustion engine 2, sufficiently to be masked behind road noises etc. during vehicle travel, and causes no uncomfortable feeling to a driver and a passenger.

Upon starting the driving of electric actuator 46 for the electric power consumption during the regenerative operation, it is favorable to drive electric actuator 46 initially in a direction to a high compression ratio side with respect to the mechanical compression ratio at that time. The electric power consumption is greater in amount, in driving to the high compression ratio side than in driving to a low compression ratio side, even without combustion. Accordingly, the surplus electric power is more effectively consumed by initially driving the electric actuator 46 to the high compression ratio side.

Upon the forcible driving of electric actuator 46 for the electric power consumption during the regenerative operation, it is favorable to set the mechanical compression ratio to vary to the high compression ratio side beyond a compression ratio control range for normal operation. In detail, in case that the basic target compression ratio during operation of internal combustion engine 2 varies within a range between a lower limit compression ratio and a first value of upper limit compression ratio, it is favorable to raise the upper limit compression ratio to a second value of upper limit compression ratio higher than the first value of upper limit compression ratio, during the upward and downward change in mechanical compression ratio for the electric power consumption. For example, in case of setting the lower limit compression ratio to "8", the first value of upper limit compression ratio to "14", and the second value of upper limit compression ratio to "15", the mechanical compression ratio is controlled to vary within a range of "8 to 14" during the normal operation, and is allowed to vary to "15" during the forcible compression ratio change for the electric power consumption. The second value of upper limit compression ratio may be heightened within a range not interfering with intake valves 14 and/or exhaust valves 15, because being free from restriction in view of knockings.

This configuration of setting the mechanical compression ratio to vary to the high compression ratio side beyond the compression ratio control range for normal operation causes piston 31 in cylinder 30 to rise beyond the highest position in the normal operation, if the cylinder is close to top dead center. This causes a piston ring of piston 31 to scoop up oil to a higher position in cylinder 30, and serves to lubricate a region that is not lubricated during the normal operation.

The following exemplifies two considerable aspects of how to set the compression ratio control range for the electric power consumption during the regenerative operation. As a first aspect, the mechanical compression to ratio may be set to change upward and downward within a range between the first value of upper limit compression ratio and the second value of upper limit compression ratio. For example, the mechanical compression ratio is set to repetitively change between the first value of upper limit compression ratio "14" and the second value of upper limit compression ratio "15". As a second aspect, the mechanical compression ratio may be set to change upward and downward within a range between the lower limit compression ratio and the second value of upper limit compression ratio. For example, the mechanical compression ratio is set to repetitively change between the lower limit compression ratio "8" and the second value of upper limit compression ratio "15".

According to the first aspect, the piston ring reciprocates in a section along an inner periphery of cylinder 30 which is not lubricated during the normal operation. This serves to actively lubricate the section. According to the second aspect, the piston ring moves upward from a lower position than the first aspect. This serves to utilize oil scooped up from a lower section for lubrication. In view of the electric power consumption, the first aspect in which the compression ratio changes within a higher compression ratio range is more beneficial.

Thus, the above embodiment serves to avoid overcharging battery 5 while securing the regenerative braking force, by consuming the surplus electric power in the driving of electric actuator 46 in response to satisfaction of the condition that the SOC of battery 5 is equal to or higher than the SOC 1. Furthermore, the above embodiment serves to raise an oil temperature in respective parts of variable compression ratio mechanism 12 and consequently reduce friction, by operating the variable compression ratio mechanism 12 with use of the surplus electric power. In general, a hybrid car tends to undergo a low oil temperature and a high friction because internal combustion engine 2 is not always in operation. On the other hand, the above embodiment is configured to drive the electric actuator 46 with the surplus electric power and move the links composing the multi-link piston crank mechanism, during the stop of internal combustion engine 2. Simultaneously with the movement of the links, electric motor 47 of electric actuator 46 emits heat that is transferred to respective parts. This serves to warm the oil in sliding contact portions, and reduce a friction upon starting internal combustion engine 2, and thereby improve fuel efficiency.

Although the above details the embodiment of the present invention with reference to the drawings, the present invention is not limited to that, and may be variously modified. For example, although the above embodiment shows the series hybrid vehicle, the present invention may be applied to other types of hybrid vehicles such as parallel hybrid vehicles and series-parallel hybrid vehicles. Furthermore, the surplus power consumption using the electric actuator of the variable compression ratio mechanism according to the present invention may be employed in combination with other means for surplus power consumption.

The invention claimed is:

1. A control method for a hybrid vehicle including an internal combustion engine and a motor generator, wherein the internal combustion engine includes a variable compression ratio mechanism structured to vary in mechanical compression ratio depending on variation in position of a compression ratio control member structured to move due to driving of an electric actuator, the control method comprising:
    measuring a state of charge of a battery connected to the motor generator; and
    in response to regenerative operation of the motor generator in a state that the state of charge of the battery is equal to or higher than a predetermined level, consuming generated electric power by driving the electric actuator of the variable compression ratio mechanism with rotation of the internal combustion engine stopped,
    wherein the electric power consumption is performed by continuously driving the electric actuator during the regenerative operation so as to cause the compression ratio to change upward or downward without following a basic target compression ratio set to achieve a fuel efficiency level depending on engine operation conditions, with use of the electric actuator.

2. The control method as claimed in claim 1, wherein the variable compression ratio mechanism is structured to vertically vary in position of piston top dead center in a cylinder depending on the variation in position of the compression ratio control member, the control method further comprising:

setting the basic target compression ratio within a range between a lower limit compression ratio and a first value of upper limit compression ratio, during operation of the internal combustion engine; and
raising the upper limit compression ratio to a second value of upper limit compression ratio higher than the first value of upper limit compression ratio, during the upward and downward change in compression ratio for the electric power consumption.

3. The control method as claimed in claim 2, wherein the compression ratio is set to change upward and downward within a range between the first upper limit compression ratio and the second upper limit compression ratio.

4. The control method as claimed in claim 2, wherein the compression ratio is set to change upward and downward within a range between the lower limit compression ratio and the second upper limit compression ratio.

5. The control method as claimed in claim 1, wherein upon starting the driving of the electric actuator for the electric power consumption, the electric actuator is initially driven to a high compression ratio side.

6. The control method as claimed in claim 1, wherein the variable compression ratio mechanism includes:
    a first link including a first end connected to a piston via a piston pin;
    a second link connected to a second end of the first link via a first connection pin and connected to a crank pin of a crank shaft;
    a third link including a first end connected to the second link via a second connection pin; and
    the compression ratio control member that has a shape of shaft and includes an eccentric shaft swingably supporting a second end of the third link, wherein the eccentric shaft varies in position due to rotation of the compression ratio control member driven by the electric actuator.

7. A control device for a hybrid vehicle including an internal combustion engine, a motor generator, and a battery, wherein the internal combustion engine includes a variable compression ratio mechanism structured to vary in mechanical compression ratio depending on variation in position of a compression ratio control member structured to move due to driving of an electric actuator, the control device comprising:
    a controller configured to:
    determine whether a state of charge of the battery is equal to or higher than a predetermined level; and
    in response to regenerative operation of the motor generator in a state that the state of charge of the battery is equal to or higher than the predetermined level, drive the electric actuator of the variable compression ratio mechanism with rotation of the internal combustion engine stopped, in order to consume generated electric power,
    wherein the electric power consumption is performed by continuously driving the electric actuator during the regenerative operation so as to cause the compression ratio to change upward or downward without following a basic target compression ratio set to achieve a fuel efficiency level depending on engine operation conditions, with use of the electric actuator.

* * * * *